(12) United States Patent
Hsieh et al.

(10) Patent No.: US 7,755,499 B2
(45) Date of Patent: Jul. 13, 2010

(54) DETECTING APPARATUS FOR DETECTING OPERATION OF FAN

(75) Inventors: Ming-Chih Hsieh, Taipei Hsien (TW); Yang-Yuan Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 387 days.

(21) Appl. No.: 11/967,045

(22) Filed: Dec. 29, 2007

(65) Prior Publication Data

US 2009/0109044 A1 Apr. 30, 2009

(30) Foreign Application Priority Data

Oct. 25, 2007 (CN) .......................... 2007 1 0202247

(51) Int. Cl.
*G08B 21/00* (2006.01)
*G05B 5/00* (2006.01)
*G01F 1/68* (2006.01)

(52) U.S. Cl. ........................ 340/606; 340/635; 340/648; 318/483; 73/204.17

(58) Field of Classification Search ................. 340/635, 340/606, 648; 318/483; 73/204.17
See application file for complete search history.

(56) References Cited

U.S. PATENT DOCUMENTS 4,748,390 A * 5/1988 Okushima et al. ........... 318/483
5,289,089 A * 2/1994 Aoki ....................... 318/400.26
6,691,568 B2 * 2/2004 Akamatsu ................. 73/204.17
7,661,305 B2 * 2/2010 Hsieh et al. .................... 73/253
2001/0009109 A1 * 7/2001 Akamatsu ................. 73/204.17
2005/0268711 A1 * 12/2005 Akamatsu ................. 73/204.15
2007/0115599 A1 * 5/2007 Chen et al. ................... 361/104
2008/0106228 A1 * 5/2008 Ye et al. ....................... 318/479
2008/0236295 A1 * 10/2008 Hsieh ........................ 73/861.08

* cited by examiner

*Primary Examiner*—George A Bugg
*Assistant Examiner*—Jack Wang
(74) *Attorney, Agent, or Firm*—Frank R. Niranjan

(57) ABSTRACT

A detecting apparatus for detecting operation of a fan, includes a first current module disposed at an airflow path of the fan, a second current module insulated from the airflow, and an indicating module for giving an indicating signal, having a LED, and a transistor. The first and second current modules being mirror-images of each other. When the fan does not operate, the first and second current modules operate the same. The transistor of the indicating module is turned off, and the LED to be lit. When the fan operates, current flow of the first and second modules are different from each other producing a voltage greater than zero, the transistor of the indicating module is turned on, and the LED does not light.

7 Claims, 1 Drawing Sheet

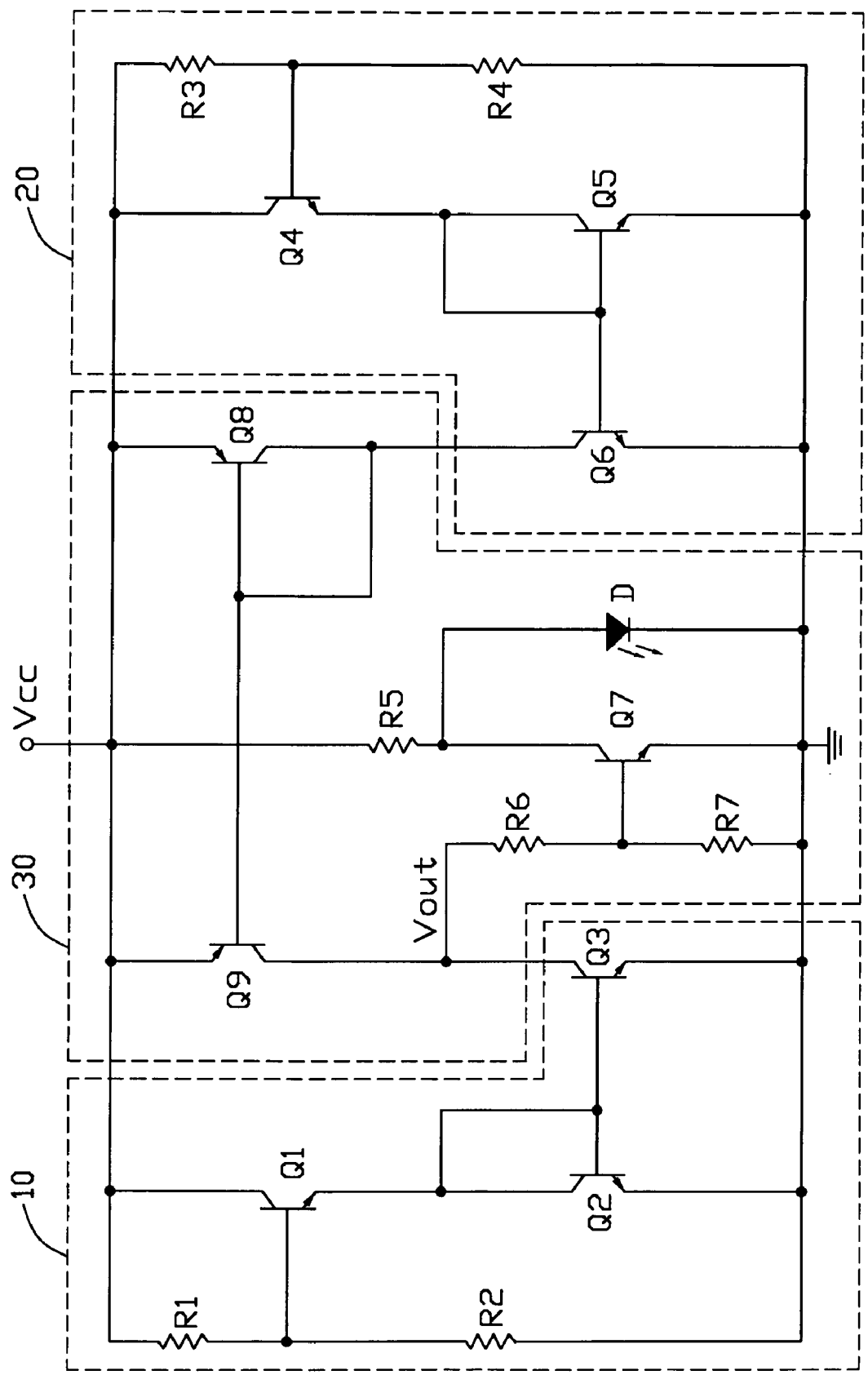

DETECTING APPARATUS FOR DETECTING OPERATION OF FAN

BACKGROUND

1. Field of the Invention

The present invention relates to a detecting apparatus for detecting operation of a fan.

2. Description of Related Art

Usually, an airflow meter or an airflow switch is employed for detecting airflow from a fan. Electronic airflow meters have a high sensitivity but are expensive and inconvenient to use. Airflow switches have a relatively low price, but are less sensitive.

What is desired, therefore, is to provide a detecting apparatus for detecting operation of a fan, having high sensitivity but low-cost.

SUMMARY

In one embodiment, a detecting apparatus for detecting operation of a fan, includes a first current module set at an outside of the fan, having a first transistor, a second transistor, a third transistor, and a first resistor, a second current module set on an inner side of the fan, having a fourth transistor, a fifth transistor, a sixth transistor, and a second resistor, and an indicating module having a power source, a seventh transistor, an indicating element, and a third resistor. The base of the first transistor is connected to the power source, and to ground through the first resistor. The collector of the first transistor is connected to the power source. The emitter of the first transistor is connected to the collector of the second transistor and a node between the base of the second transistor and the base of the third transistor. The emitters of the second and third transistors connect to ground. The collector of the third transistor is connected to a node of the indicating module. The base of the fourth transistor is connected to the power source, and ground through the second resistor. The collector of the fourth transistor is connected to the power source. The emitter of the fourth transistor is connected to the collector of the fifth transistor and a node between the base of the fifth transistor and the base of the sixth transistor. The emitters of the fifth and sixth transistors connect to ground. The base of the seventh transistor is connected to the collector of the third transistor and to ground through the third resistor. The collector of the seventh transistor is connected to the power source and grounded via the indicating element. The emitter of the seventh transistor is grounded.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a detecting apparatus for detecting operation of fan in accordance with an embodiment of the present invention.

DETAILED DESCRIPTION

Referring to the drawing, a detecting apparatus for detecting operation of a fan in accordance with an embodiment of the present invention includes two current modules 10 and 20, and an indicating module 30. The indicating module 30 is connected between the current module 10 and the current module 20 and includes an indicating element D viewable by a user. In this embodiment, the indicating element D is a light emitting diode (LED) D. The current module 10 is set at an outside of the fan, and disposed in an airflow of the fan. The current module 20 is set at a side of the fan outside of the airflow of the fan.

The current module 10 includes two resistors R1 and R2, and three transistors Q1~Q3. The base of the transistor Q1 is connected to a power source Vcc through the resistor R1 and to ground through the resistor R2. The collector of the transistor Q1 is connected to a node between the resistor R1 and the power source Vcc, the node being a connection between the module 10 and the indicating module 30. The emitter of the transistor Q1 is connected to the collector of the transistor Q2 and a node between the base of the transistor Q2 and the base of the transistor Q3. The emitters of the transistors Q2, Q3 connect to ground. The collector of the transistor Q3 is connected to a node Vout of the indicating module 30. The resistors R1 are provided for limiting current. Alternatively, the resistors R1 can be deleted to save cost.

The current module 20 includes two resistors R3 and R4, and three transistors Q4~Q6. The base of the transistor Q4 is connected to the power source Vcc through the resistor R3 and to ground through the resistor R4. The collector of the transistor Q4 is connected to a node between the resistor R3 and the power source Vcc, the node being a connection between the module 20 and the indicating module 30. The emitter of the transistor Q4 is connected to the collector of the transistor Q5 and a node between the base of the transistor Q5 and the base of the transistor Q6. The emitters of the transistors Q5, Q6 are connected to ground. The collector of the transistor Q6 is connected to a node Vout of the indicating module 30. The resistors R3 are provided for limiting current. Alternatively, the resistors R3 can be deleted to save cost.

The indicating module 30 includes three resistors R5~R7, three transistors Q7~Q9, and the LED D. The emitter of the transistor Q9 is connected to the power source Vcc. The base of the transistor Q9 is connected to the base of the transistor Q8 and a node between the collector of the transistor Q8 and the collector of the transistor Q6. The collector of the transistor Q9 is connected to the node Vout, and grounded via the resistors R6, R7. The base of the transistor Q7 is connected to a node between the resistor R6 and the resistor R7. The emitter of the transistor Q7 is grounded. The collector of the transistor Q7 is connected to the anode of the LED D, and connected to the power source Vcc via the resistor R5. The cathode of the LED D is grounded. The emitter of the transistor Q8 is connected to the power source Vcc. In this embodiment, the resistors R6 and R7 can be replaced by two variable resistors. The resistors R5 and R6 are provided for limiting current. The transistors Q8 and Q9 are provided for improving the precision of current. Alternatively, the resistors R5 and R6, and the transistors Q8 and Q9 can be deleted to save cost.

The current modules 10 and 20 are mirror-images of each other, and current characteristics thereof should be identical if operating under identical circumstances. That is, there should be zero net voltage at the node Vout when the current modules 10, 20 operate the same. Therefore no voltage is available to bias the transistor Q7, and so the transistor Q7 is turned off and the LED D does not light. However, because of temperature characteristics of transistors, because the module 10 is positioned in the airflow of the fan and the module 20 is not, then there will be a temperature differential when the fan operates. This means current flow of the two modules 10, 20 are different from each other producing a net voltage greater than zero at the Vout node, thus biasing the transistor Q7 turning it on, and in turn the transistor Q7 supplies power to the LED D turning it on. The user can then quickly and easily determine the status of the fan and airflow therefrom.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A detecting apparatus for detecting an operation of a fan, the detecting apparatus comprising:

a first current module disposed at an airflow path of the fan, and comprising a first transistor, a second transistor, a third transistor, and a first resistor, the base of the first transistor connected to a power source, and to ground through the first resistor, the collector of the first transistor connected to the power source, the emitter of the first transistor connected to the collector of the second transistor and the base of the second transistor, the base of the second transistor connected to the base of the third transistor, the emitters of the second and third transistors connected to ground, the collector of the third transistor acting as an output;

a second current module insulated from the airflow, and comprising a fourth transistor, a fifth transistor, a sixth transistor, and a second resistor, the first and second current modules being mirror-images of each other, the base of the fourth transistor connected to the power source, and to ground through the second resistor, the collector of the fourth transistor connected to the power source, the emitter of the fourth transistor connected to the collector of the fifth transistor and the base of the fifth transistor, the base of the fifth transistor connected to the base of the sixth transistor, the emitters of the fifth and sixth transistors connected to ground, the collector of the sixth transistor connected to the output; and an indicating module comprising a seventh transistor, and an indicating element, the base of the seventh transistor connected to the output to receive a comparision of currents coming from the collectors of the third transistor and the sixth transistor, the collector of the seventh transistor connected to the power source, the emitter of the seventh transistor grounded, turning on or off the seventh transistor controlling the indicating element to indicate operation status of the fan.

2. The detecting apparatus as claimed in claim 1, wherein the indicating element comprises a light emitting diode (LED), the anode of the LED is connected to the collector of the seventh transistor, and the cathode of the LED is grounded.

3. The detecting apparatus as claimed in claim 1, wherein the base of the first transistor is connected to the power source through a third resistor.

4. The detecting apparatus as claimed in claim 1, wherein the base of the fourth transistor is connected to the power source through a fourth resistor.

5. The detecting apparatus as claimed in claim 1, wherein the indicating module further comprises an eighth transistor and a ninth transistor, the collector of the ninth transistor is connected to the collector of the third transistor, the emitters of the eighth and ninth transistors are connected to the power source, the base of the ninth transistor is connected to the base of the eighth transistor and the collector of the eighth transistor, the collector of the eighth transistor is connected to the collector of the sixth transistor.

6. The detecting apparatus as claimed in claim 1, further comprising a sixth resistor and a seventh resistor connected in series between the output and ground, the base of the seventh transistor connected to a node between the sixth and seventh resistors.

7. The detecting apparatus as claimed in claim 1, wherein the power source is connected to the collector of the seventh transistor via a fifth resistor.

* * * * *